(12) United States Patent
Zhang

(10) Patent No.: US 12,177,817 B2
(45) Date of Patent: *Dec. 24, 2024

(54) CHANNEL QUALITY RELATED FORMAT DETERMINATION FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,977

(22) Filed: Apr. 11, 2023

(65) Prior Publication Data

US 2023/0254824 A1 Aug. 10, 2023

Related U.S. Application Data

(63) Continuation of application No. 17/145,406, filed on Jan. 11, 2021, now Pat. No. 11,659,524.

(30) Foreign Application Priority Data

Jan. 22, 2020 (CN) .......................... 202010073188.8

(51) Int. Cl.
*H04W 72/04* (2023.01)
(52) U.S. Cl.
CPC .................................. *H04W 72/04* (2013.01)

(58) Field of Classification Search
CPC ..... H04W 72/04; H04W 16/00; H04W 36/06; H04W 72/12; H04B 7/024; H04L 1/0001; H04L 5/00
See application file for complete search history.

(56) References Cited

U.S. PATENT DOCUMENTS

| | | | |
|---|---|---|---|
| 2021/0218500 A1* | 7/2021 | Bhamri | H04L 1/0021 |
| 2022/0053490 A1* | 2/2022 | Zhang | H04L 1/1887 |
| 2022/0110181 A1* | 4/2022 | Miao | H04L 1/1822 |

FOREIGN PATENT DOCUMENTS

WO WO-2020210333 A1 * 10/2020 ........... H04L 1/1812

* cited by examiner

*Primary Examiner* — Ian N Moore
*Assistant Examiner* — Brian T Le

(57) ABSTRACT

The present disclosure provides a method and device in a node for wireless communications. A first receiver receives a first signal and a second signal; a first transmitter transmits a third signal in a first radio resource pool; wherein the first signal is used for determining first information, the first information being related to channel quality between the first node and a transmitter of the first signal; the second signal is used for determining second information, the second information being related to channel quality between a transmitter of the second signal and the first node; the transmitter of the first signal is different from the transmitter of the second signal; and the first information and the second information are used together for determining a magnitude of time-domain resources occupied by the third signal.

16 Claims, 9 Drawing Sheets

First value = min(first upper limit, first threshold + first parameter× first information+ first adjustment)

FIG. 7

First value = min(first upper limit, first threshold + first parameter × first information +First adjustment + second adjustment)

FIG. 8

Second value = min(second upper limit, second threshold + second parameter × second information + third adjustment)

FIG. 9

Second value = min(second upper limit, second threshold + second parameter × second information + third adjustment + fourth adjustment)

FIG. 10

CHANNEL QUALITY RELATED FORMAT DETERMINATION FOR WIRELESS COMMUNICATION

CROSS REFERENCE TO RELATED APPLICATIONS

This application is the continuation of the U.S. patent application Ser. No. 17/145,406, filed on Jan. 11, 2021, which claims the priority benefit of Chinese Patent Application No.202010073188.8, field Jan 22, 2020, the full disclosure of which is incorporated herein by reference.

BACKGROUND

Technical Field

The present disclosure relates to transmission methods and devices in wireless communication systems, and in particular to a transmission method and device related to Sidelink in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. Besides, 3GPP RAN #80 plenary session has started an NR-based V2X technical research.

SUMMARY

In discussion related to Hybrid Automatic Repeat Request (HARQ) feedback in NR V2X, 3GPP has introduced Physical Sidelink Feedback Channel (PSFCH) and has agreed to use PSFCH format 0 that only occupies one Orthogonal Frequency Division Multiplexing (OFDM) symbol as a feedback format. Since transmission power of the PSFCH is limited by interference of a transmitter of the PSFCH to a base station, the PSFCH format 0 with single symbol may not be enough to support a detection performed by a receiver of the PSFCH on the HARQ feedback. The introduction of a PSFCH format that occupies multiple symbols and a reasonable selection among multiple formats may effectively improve communication efficiency.

In view of the above problem, the present disclosure provides a solution. It should be noted that only the NR V2X scenario is used as a typical application scenario or example in the present disclosure; the present disclosure is also applicable to scenarios facing similar problems other than the NR V2X to acquire technical effects similar in the NR V2X scenario. Besides, a unified solution for different scenarios (including but not limited to the NR V2X scenario) can also help reduce hardware complexity and cost. The embodiments of any node in the present disclosure and the characteristics of the embodiments may be applied to any other node if no conflict is incurred. The embodiments of the present disclosure and the characteristics of the embodiments may be mutually combined if no conflict is incurred. Particularly, interpretations (if not specified) of terminology, nouns, functions and variables in the present disclosure can be found in definitions in specification protocols of 3GPP TS36, TS38 and TS37 series.

The present disclosure provides a method in a first node for wireless communications, comprising:
receiving a first signal and a second signal; and
transmitting a third signal in a first radio resource pool;
herein, the first signal is used for determining first information, the first information being related to channel quality between the first node and a transmitter of the first signal; the second signal is used for determining second information, the second information being related to channel quality between a transmitter of the second signal and the first node; the transmitter of the first signal is different from the transmitter of the second signal; the first information and the second information are used together for determining a magnitude of time-domain resources occupied by the third signal.

In one embodiment, a problem needed to be solved in the present disclosure comprises: how to reasonably select a PSFCH format based on pathlosses from the PSFCH transmitter to the base station and from the PSFCH transmitter to the PSFCH receiver.

In one embodiment, the above method is characterized in that the pathlosses from the PSFCH transmitter to the base station and from the PSFCH transmitter to the PSFCH receiver are used together for determining whether a short PSFCH format or a long PSFCH format is used for transmitting HARQ feedback.

In one embodiment, the above method is advantageous in that probability of correct reception of PSFCH is increased through selection of different PSFCH formats, so as to improve system efficiency.

According to one aspect of the present disclosure, wherein
a fourth signal is received in a second radio resource pool;
herein, the fourth signal carries a first bit block, and the third signal comprises indication information on whether the first bit block is correctly received.

According to one aspect of the present disclosure, wherein
the second information is used for determining transmission power of the third signal.

According to one aspect of the present disclosure, wherein
a fifth signal is transmitted, and the fifth information is used for determining the second information.

According to one aspect of the present disclosure, wherein
a transmission format of the third signal is one format in a first format set, and the first information and the second information are used together for determining a transmission format of the third signal out of the first format set.

According to one aspect of the present disclosure, wherein
a sixth signal is transmitted, and the sixth signal is used for determining the first information.

According to one aspect of the present disclosure, comprising:

the first information being used for calculating a first value, and the second information being used for calculating a second value;

when a difference value between the first value and the second value is less than a first threshold, a transmission format of the third signal being a first format; otherwise, a transmission format of the third signal being a second format;

herein, a number of the time-domain resources occupied by the first format is less than a number of the time-domain resources occupied by the second format, and the first threshold is a non-negative number.

In one embodiment, the above method is characterized in that when a difference value between calculated expect transmission power required by the PSFCH receiver for detection and actual transmission power is less than a given threshold, a shorter PSFCH format is selected for transmitting the third signal; otherwise, a longer PSFCH format is selected for transmitting the third signal.

According to one aspect of the present disclosure, wherein the first node is a UE.

According to one aspect of the present disclosure, wherein the first node is a relay node.

The present disclosure provides a method in a second node for wireless communications, comprising:

transmitting a first signal; and receiving a third signal in a first radio resource pool;

herein, the first signal is used for determining first information, the first information being related to channel quality between the second node and a receiver of the first signal; a second signal is used for determining second information, the second information being related to channel quality between a transmitter of the second signal and a receiver of the second signal; the second node is different from the transmitter of the second signal; the first information and the second information are used together for determining a magnitude of time-domain resources occupied by the third signal.

According to one aspect of the present disclosure, wherein a fourth signal is transmitted in a second radio resource pool;

herein, the fourth signal carries a first bit block, and the third signal comprises indication information on whether the first bit block is correctly received.

According to one aspect of the present disclosure, wherein the second information is used for determining transmission power of the third signal.

According to one aspect of the present disclosure, wherein a fifth signal is received, and the fifth information is used for determining the second information.

According to one aspect of the present disclosure, wherein a transmission format of the third signal is one format in a first format set, and the first information and the second information are used together for determining a transmission format of the third signal out of the first format set.

According to one aspect of the present disclosure, wherein a sixth signal is received, and the sixth signal is used for determining the first information.

According to one aspect of the present disclosure, comprising:

the first information being used for calculating a first value, and the second information being used for calculating a second value; and when a difference value between the first value and the second value is less than a first threshold, a transmission format of the third signal being a first format; otherwise, a transmission format of the third signal being a second format;

herein, a number of the time-domain resources occupied by the first format is less than a number of the time-domain resources occupied by the second format, and the first threshold is a non-negative number.

According to one aspect of the present disclosure, wherein the second node is a UE.

According to one aspect of the present disclosure, wherein the second node is a relay node.

According to one aspect of the present disclosure, wherein the second node is a base station.

The present disclosure provides a first node for wireless communications, comprising:

a first receiver, receiving a first signal and a second signal; and a first transmitter, transmitting a third signal in a first radio resource pool;

herein, the first signal is used for determining first information, the first information being related to channel quality between the first node and a transmitter of the first signal; the second signal is used for determining second information, the second information being related to channel quality between a transmitter of the second signal and the first node; the transmitter of the first signal is different from the transmitter of the second signal; the first information and the second information are used together for determining a magnitude of time-domain resources occupied by the third signal.

The present disclosure provides a second node for wireless communications, comprising:

a second transmitter, transmitting a first signal; and a second receiver, receiving a third signal in a first radio resource pool;

herein, the first signal is used for determining first information, the first information being related to channel quality between the second node and a receiver of the first signal; a second signal is used for determining second information, the second information being related to channel quality between a transmitter of the second signal and a receiver of the second signal; the second node is different from the transmitter of the second signal; the first information and the second information are used together for determining a magnitude of time-domain resources occupied by the third signal.

In one embodiment, the present disclosure has the following advantages over conventional schemes:

the PSFCH transmitter selects an appropriate format out of multiple PSFCH formats for transmission;

a PSFCH format is reasonably selected based on pathlosses from the PSFCH transmitter to the base station and from the PSFCH transmitter to the PSFCH receiver, which relieves reception performance degradation of the PSFCH receiver incurred by insufficient transmission power brought by interference limitation;

and probability of correct reception of the PSFCH through selection of different PSFCH formats is increased, so as to improve system efficiency.

BRIEF DESCRIPTION OF THE DRAWINGS

Other features, objects and advantages of the present disclosure will become more apparent from the detailed description of non-restrictive embodiments taken in conjunction with the following drawings:

FIG. 7 illustrates a schematic diagram of a calculation method of a first value according to one embodiment of the present disclosure.

FIG. 8 illustrates a schematic diagram of a calculation method of a first value according to one embodiment of the present disclosure.

FIG. 9 illustrates a schematic diagram of a calculation method of a second value according to one embodiment of the present disclosure.

FIG. 10 illustrates a schematic diagram of a calculation method of a second value according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
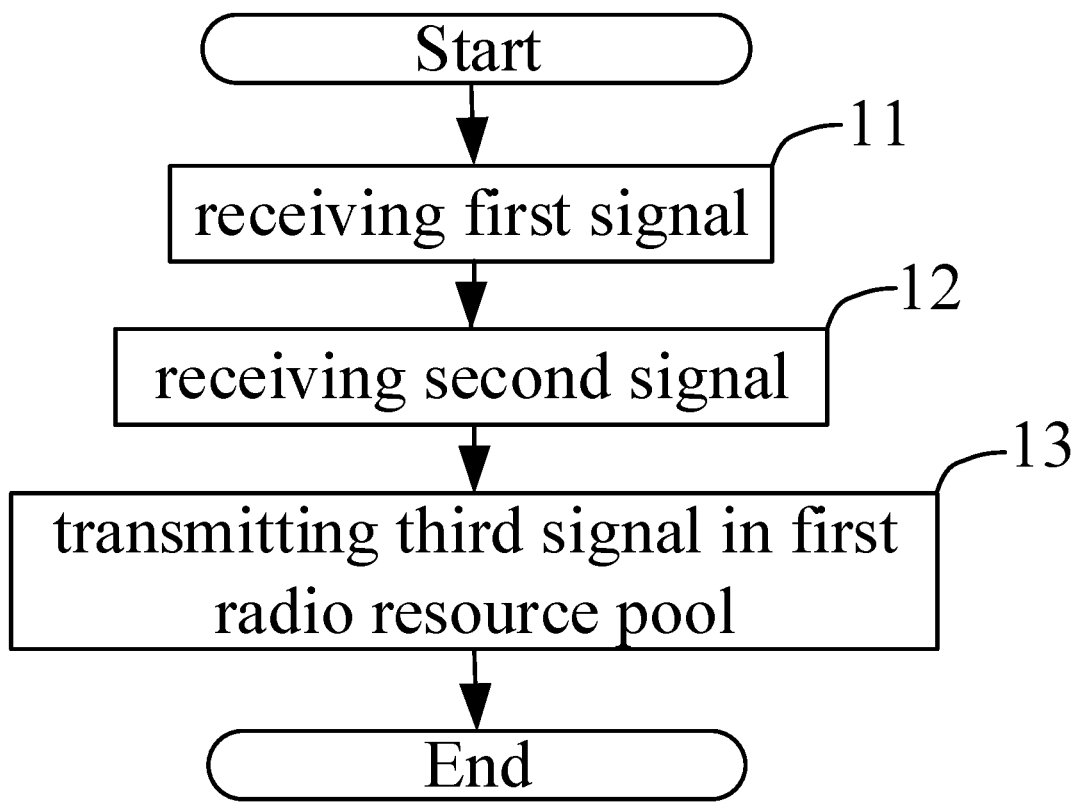
FIG. 1 illustrates a processing flowchart of a first node according to one embodiment of the present disclosure.

Embodiment 1 illustrates a processing flowchart of a first node according to one embodiment of the present disclosure, as shown in FIG. 1.

In Embodiment 1, the first node in the present disclosure receives a first signal in step 11; receives a second signal in step 12; and transmits a third signal in a first radio resource pool in step 13.

In Embodiment 1, the first signal is used for determining first information, the first information being related to channel quality between the first node and a transmitter of the first signal; the second signal is used for determining second information, the second information being related to channel quality between a transmitter of the second signal and the first node; the transmitter of the first signal is different from the transmitter of the second signal; the first information and the second information are used together for determining a magnitude of time-domain resources occupied by the third signal.

In one embodiment, the first signal is a baseband signal.
In one embodiment, the first signal is a radio signal.
In one embodiment, the first signal is Unicast.
In one embodiment, the first signal is Groupcast.
In one embodiment, the first signal is Broadcast.
In one embodiment, the first signal is transmitted via a PC5 interface.
In one embodiment, the first signal is transmitted via a Uu interface.
In one embodiment, the first signal is transmitted on a Sidelink.
In one embodiment, the first signal is transmitted on a cellular link.
In one embodiment, the second signal is a baseband signal.
In one embodiment, the second signal is a radio signal.
In one embodiment, the second signal is Unicast.
In one embodiment, the second signal is Groupcast.
In one embodiment, the second signal is Broadcast.
In one embodiment, the second signal is transmitted via a PC5 interface.
In one embodiment, the second signal is transmitted via a Uu interface.
In one embodiment, the second signal is transmitted on a cellular link.
In one embodiment, the second signal is transmitted on a Sidelink.
In one embodiment, the third signal is a baseband signal.
In one embodiment, the third signal is a radio signal.
In one embodiment, the third signal is Unicast.
In one embodiment, the third signal is Groupcast.
In one embodiment, the third signal is Broadcast.
In one embodiment, the third signal is transmitted via a PC5 interface.
In one embodiment, the third signal is transmitted via a Uu interface.
In one embodiment, the third signal is transmitted on a Sidelink.
In one embodiment, the third signal is transmitted on a cellular link.
In one embodiment, a transmitter of the first signal is a UE, and a transmitter of the second signal is a base station.
In one embodiment, a transmitter of the first signal is a base station, and a transmitter of the second signal is another base station.
In one embodiment, a transmitter of the first signal is a UE, and a transmitter of the second signal is another UE.
In one embodiment, the first information is a pathloss between the first node and a transmitter of the first signal.
In one embodiment, the second information is a pathloss between the first node and a transmitter of the second signal.
In one embodiment, the first information is Reference Signal Receiving Power (RSRP) obtained by the first node performing a measurement on a signal transmitted through a channel between the first node and a transmitter of the first node.
In one embodiment, the first information is RSRP obtained by a transmitter of the first signal performing a measurement on a signal transmitted through a channel between the first node and a transmitter of the first node.
In one embodiment, the second information is RSRP obtained by the first node performing a measurement on a signal transmitted through a channel between the first node and a transmitter of the second node.

In one embodiment, the second information is RSRP obtained by a transmitter of the second signal performing a measurement on a signal transmitted through a channel between the first node and a transmitter of the second node.

In one embodiment, the first signal comprises the first information.

In one embodiment, the first signal explicitly indicates the first information.

In one embodiment, the first signal implicitly indicates the first information.

In one embodiment, the first signal comprises third information, and the third information is used for calculating the first information.

In one subembodiment of the above embodiment, the third information is RSRP measured by a transmitter of the first signal In one subembodiment of the above embodiment, the first information is a pathloss between the first node and a transmitter of the first signal.

In one embodiment, the first signal comprises a first reference signal, and the first reference signal is used for determining first information.

In one subembodiment of the above embodiment, the first node obtains RSRP by measuring the first reference signal, and the RSRP is used for calculating the first information.

In one subembodiment of the above embodiment, the first reference signal is a Demodulation Reference Signal (DMRS).

In one subembodiment of the above embodiment, the first reference signal is a Channel State Information Reference Signal (CSI-RS).

In one subembodiment of the above embodiment, the first reference signal is a Sounding Reference Signal (SRS).

In one subembodiment of the above embodiment, the first reference signal is a Sidelink Channel State Information Reference Signal (SL CSI-RS).

In one embodiment, the second signal comprises the second information.

In one embodiment, the second signal explicitly indicates the second information.

In one embodiment, the second signal implicitly indicates the second information.

In one embodiment, the second signal comprises fourth information, and the fourth information is used for calculating the second information.

In one subembodiment of the above embodiment, the fourth information is RSRP measured by a transmitter of the second signal In one subembodiment of the above embodiment, the second information is a pathloss between the first node and a transmitter of the second signal.

In one embodiment, the second signal comprises a second reference signal, and the second reference signal is used for determining second information.

In one subembodiment of the above embodiment, the first node obtains RSRP by measuring the second reference signal, and the RSRP is used for calculating the second information.

In one subembodiment of the above embodiment, the second reference signal is a DMRS.

In one subembodiment of the above embodiment, the second reference signal is a CSI-RS.

In one subembodiment of the above embodiment, the second reference signal is an SRS.

In one subembodiment of the above embodiment, the second reference signal is an SL CSI-RS.

In one embodiment, the first radio resource pool comprises a Physical Sidelink Feedback Channel (PSFCH).

In one embodiment, the first radio resource pool comprises a Physical Uplink Control Channel (PUCCH).

In one embodiment, the first radio resource pool comprises a Narrow-band Physical Uplink Control Channel (NPUCCH).

In one embodiment, the first radio resource pool comprises a Short Physical Uplink Control Channel (SPUCCH).

In one embodiment, the first radio resource pool is a PSFCH.

In one embodiment, the first radio resource pool is a PUCCH.

In one embodiment, the first radio resource pool is an NPUCCH.

In one embodiment, the first radio resource pool is an SPUCCH.

In one embodiment, the time-domain resources comprise a positive integer number of OFDM symbol(s).

In one embodiment, the time-domain resources comprise a positive integer number of slot(s).

In one embodiment, the time-domain resources comprise a positive integer number of mini-slot(s).

In one embodiment, the time-domain resources comprise a positive integer number of ms(s).

In one embodiment, the third signal occupies one OFDM symbol.

In one embodiment, the third signal occupies multiple OFDM symbols.

In one embodiment, the first information and the second information are used together for determining whether the third signal occupies one or multiple OFDM symbols.

In one embodiment, the first information and the second information are used together for determining whether a number of OFDM symbol(s) occupied by the third signal is greater than 2.

In one embodiment, a modulation method of the third signal is one of 16 QAM, 16 QAM, 64 QAM or 256 QAM.

In one embodiment, the third signal comprises multiple information bits.

In one embodiment, the third signal comprises a Transport Block (TB).

In one embodiment, the third signal comprises one or multiple Code Block Groups (CBG).

In one embodiment, the third signal comprises a physical (PHY) layer signaling.

In one embodiment, the third signal comprises a Higher Layer signaling.

In one embodiment, the third signal comprises a Hybrid Automatic Repeat request-Acknowledge (HARQ-ACK).

Embodiment 2

Figure 2:
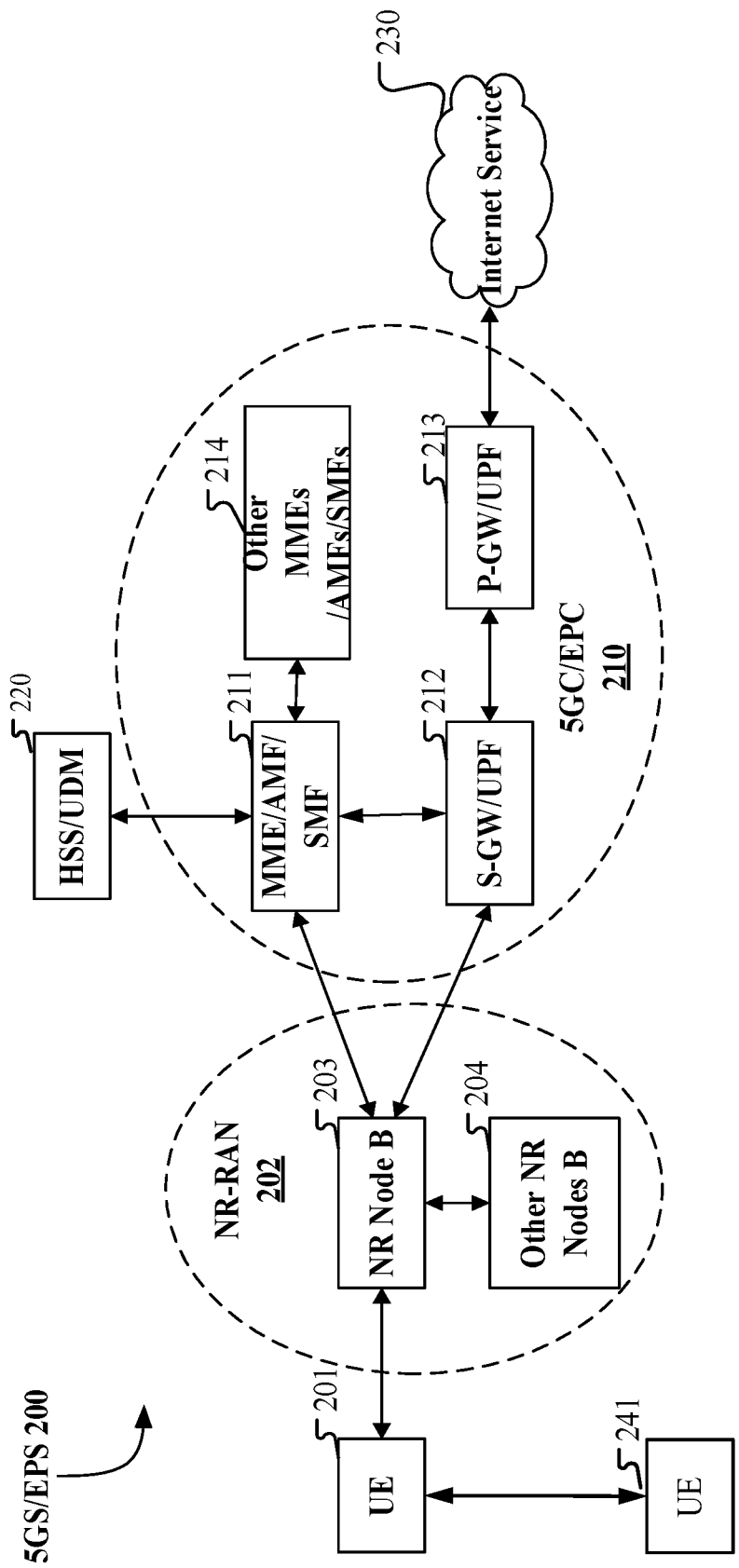
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, a UE 241 in Sidelink communications with the UE 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the first node in the present disclosure comprises the UE 241.

In one embodiment, the second node in the present disclosure comprises the UE 201.

In one embodiment, the second node in the present disclosure comprises the UE 241.

In one embodiment, the second node in the present disclosure comprises the gNB 203.

In one embodiment, an air interface between the UE 201 and the gNB 203 is a Uu interface.

In one embodiment, a radio link between the UE 201 and the gNB 203 is a cellular network link.

In one embodiment, an air interface between the UE 201 and the UE 241 is a PC5 interface.

In one embodiment, a radio link between the UE 201 and the UE 241 is a Sidelink.

In one embodiment, the first node in the present disclosure is a terminal located within the gNB 203 coverage.

In one embodiment, the first node in the present disclosure is a terminal located out of the gNB 203 coverage.

In one embodiment, the second node in the present disclosure is a terminal located within the gNB 203 coverage.

In one embodiment, the second node in the present disclosure is a terminal located out of the gNB 203 coverage.

In one embodiment, Unicast communications are supported between the UE 201 and the UE 241.

In one embodiment, Broadcast communications are supported between the UE 201 and the UE 241.

In one embodiment, Groupcast communications are supported between the UE 201 and the UE 241.

Embodiment 3

Figure 3:
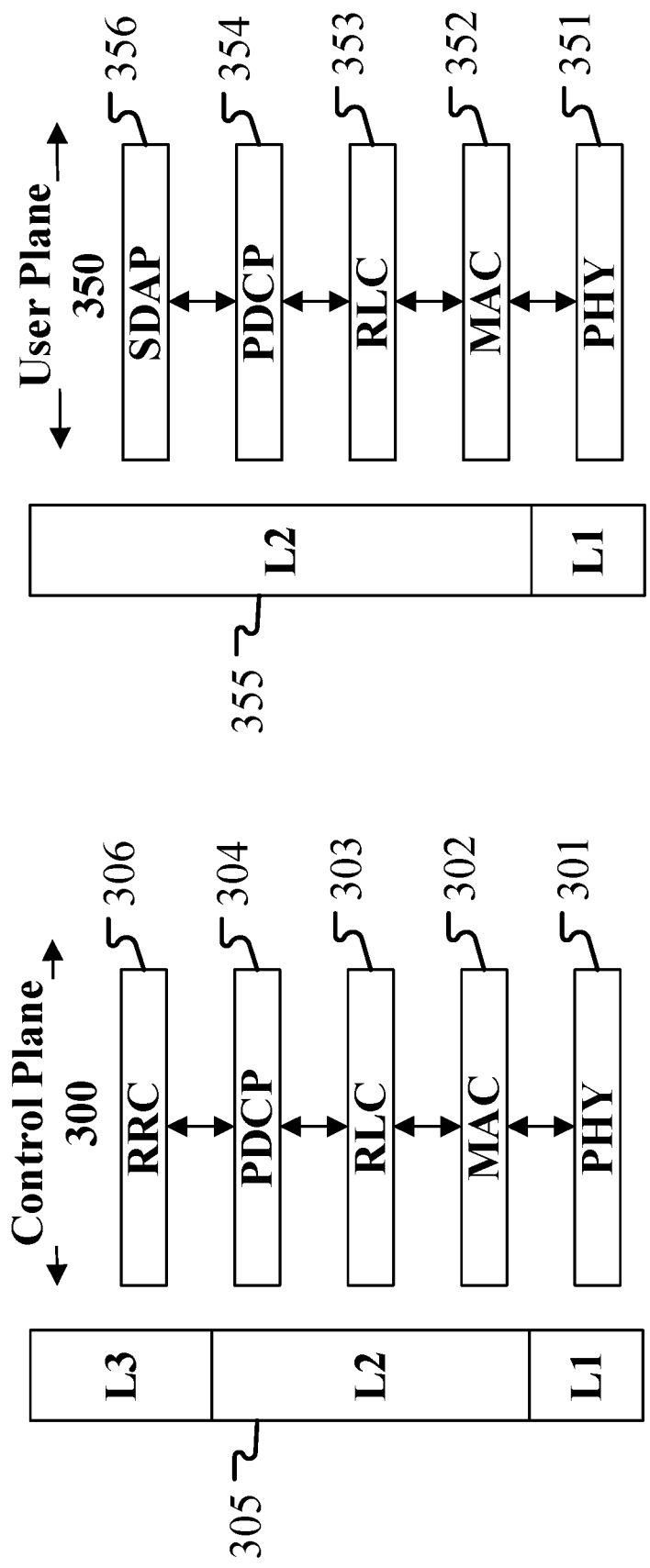
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, a RSU in gNB or V2X) and a second communication node (gNB, a RSU in UE or V2X), or between two UEs is represented by three layers, which are a layer 1, a layer 2 and a layer 3, respectively. which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource pool) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal in the present disclosure is generated by the PHY 301 or the PHY 351.

In one embodiment, the first signal block in the present disclosure is generated by the MAC sublayer 302 or the MAC sublayer 352.

In one embodiment, the first signal in the present disclosure is generated by the RRC sublayer 306.

In one embodiment, the second signal in the present disclosure is generated by the PHY 301 or the PHY 351.

In one embodiment, the second signal block in the present disclosure is generated by the MAC sublayer 302 or the MAC sublayer 352.

In one embodiment, the second signal in the present disclosure is generated by the RRC sublayer 306.

In one embodiment, the fifth signal in the present disclosure is generated by the PHY 301, or the PHY 351.

In one embodiment, the fifth signal block in the present disclosure is generated by the MAC sublayer 302 or the MAC sublayer 352.

In one embodiment, the fifth signal in the present disclosure is generated by the RRC sublayer 306.

In one embodiment, the sixth signal in the present disclosure is generated by the PHY 301 or the PHY 351.

In one embodiment, the sixth signal block in the present disclosure is generated by the MAC sublayer 302 or the MAC sublayer 352.

In one embodiment, the sixth signal in the present disclosure is generated by the RRC sublayer 306.

In one embodiment, the third signal in the present disclosure is generated by the PHY 301 or the PHY 351.

In one embodiment, the third signal block in the present disclosure is generated by the MAC sublayer 302 or the MAC sublayer 352.

In one embodiment, the fourth signal in the present disclosure is generated by the PHY 301 or the PHY 351.

Embodiment 4

Figure 4:
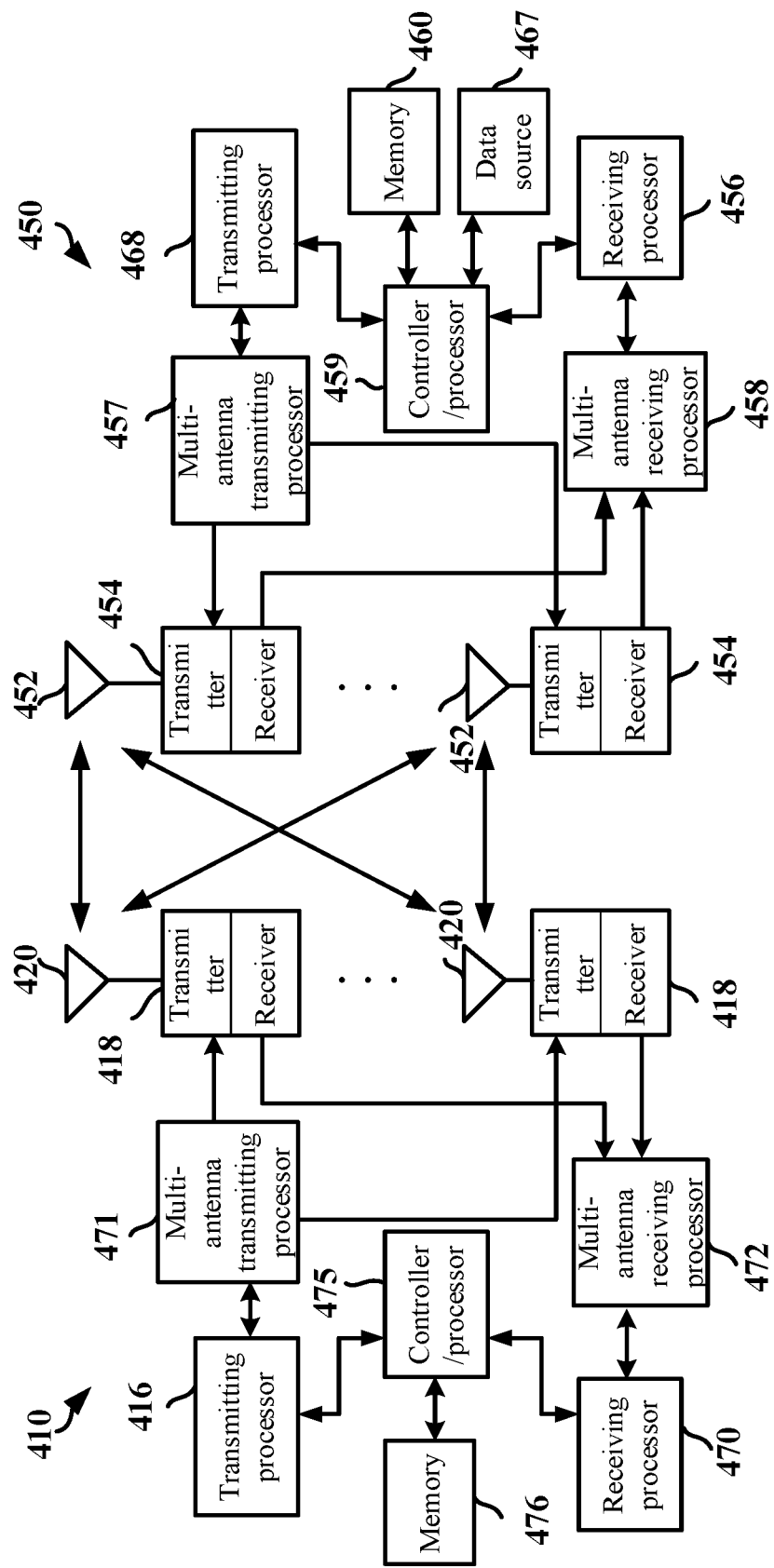
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: transmits the first signal in the present disclosure; receives the third signal in the present disclosure in the first radio resource pool in the present disclosure; the first signal is used for determining first information in the present disclosure, the first information being related to channel quality between the second node in the present disclosure and a receiver of the first signal; the second signal in the present disclosure is used for determining the second information in the present disclosure, the second information being related to channel quality between a transmitter of the second signal and a receiver of the second signal; the second node is different from the transmitter of the second signal; the first information and the second information are used together for determining a magnitude of time-domain resources occupied by the third signal.

In one embodiment, the second communication device 450 comprises a memory that stores a computer readable instruction program. The computer readable instruction program generates an action when executed by at least one processor. The action includes: transmitting the first signal in the present disclosure; receiving the third signal in the present disclosure in the first radio resource pool in the present disclosure; the first signal is used for determining first information in the present disclosure, the first information being related to channel quality between the second node in the present disclosure and a receiver of the first signal; a second signal in the present disclosure is used for determining second information in the present disclosure, the second information being related to channel quality between a transmitter of the second signal and a receiver of the second signal; the second node is different from the transmitter of the second signal; the first information and the second information are used together for determining a magnitude of time-domain resources occupied by the third signal.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: receives the first signal in the present disclosure and the second signal in the present disclosure; transmits the third signal in the present disclosure in the first radio resource pool in the present disclosure; the first signal is used for determining first information in the present disclosure, the first information being related to channel quality between the first node in the present disclosure and a transmitter of the first signal; the second signal is used for determining the second information in the present disclosure, the second information being related to channel quality between a transmitter of the second signal and the first node; the transmitter of the first signal is different from the transmitter of the second signal; the first information and the second information are used together for determining a magnitude of time-domain resources occupied by the third signal.

In one embodiment, the first communication device 410 comprises a memory that stores a computer readable instruction program. The computer readable instruction program generates an action when executed by at least one processor. The action includes: receiving the first signal in the present disclosure and the second signal in the present disclosure; transmitting the third signal in the present disclosure in the first radio resource pool in the present disclosure; the first signal is used for determining first information in the present disclosure, the first information being related to channel quality between the first node in the present disclosure and a transmitter of the first signal; the second signal is used for determining the second information in the present disclosure, the second information being related to channel quality between a transmitter of the second signal and the first node; the transmitter of the first signal is different from the transmitter of the second signal; the first information and the second information are used together for determining a magnitude of time-domain resources occupied by the third signal.

In one embodiment, the first node in the present disclosure comprises the first communication device 410.

In one embodiment, the second node comprises the second communication device 450 in the present disclosure.

In one embodiment, the second communication device 450 is a UE.

In one embodiment, the second communication device 450 is a base station.

In one embodiment, the first communication device 410 is a UE.

In one embodiment, at least one of the antenna 420, the receiver 418, the receiving processor 470, the multi-antenna receiving processor 472, the controller/processor 475 or the memory 476 is used for receiving the first signal in the present disclosure and the second signal in the present disclosure.

In one embodiment, at least one of the antenna 452, the transmitter 454, the transmitting processor 468, the multi-antenna transmitting 457, the controller/processor 459, the memory 460 or the data source 467 is used for transmitting the first signal in the present disclosure.

In one embodiment, at least one of the antenna 420, the receiver 418, the receiving processor 470, the multi-antenna receiving processor 472, the controller/processor 475 or the memory 476 is used for receiving the fourth signal in the present disclosure.

In one embodiment, at least one of the antenna 452, the transmitter 454, the transmitting processor 468, the multi-antenna transmitting 457, the controller/processor 459, the memory 460 or the data source 467 is used for transmitting the fourth signal in the present disclosure.

In one embodiment, at least one of the antenna 452, the receiver 454, the receiving processor 456, the multi-antenna receiving processor 458, the controller/processor 459, the memory 460 or the data source 467 is used for receiving the third signal in the present disclosure.

In one embodiment, at least one of the antenna 420, the transmitter 418, the transmitting processor 416, the multi-antenna transmitting processor 471, the controller/processor 475 or the memory 476 is used for transmitting the third signal in the present disclosure.

In one embodiment, at least one of the antenna 452, the receiver 454, the receiving processor 456, the multi-antenna receiving processor 458, the controller/processor 459, the memory 460 or the data source 467 is used for receiving the fifth signal in the present disclosure.

In one embodiment, at least one of the antenna 420, the transmitter 418, the transmitting processor 416, the multi-antenna transmitting processor 471, the controller/processor 475 or the memory 476 is used for transmitting the fifth signal in the present disclosure.

In one embodiment, at least one of the antenna 452, the receiver 454, the receiving processor 456, the multi-antenna receiving processor 458, the controller/processor 459, the memory 460 or the data source 467 is used for receiving the sixth signal in the present disclosure.

In one embodiment, at least one of the antenna 420, the transmitter 418, the transmitting processor 416, the multi-antenna transmitting processor 471, the controller/processor 475 or the memory 476 is used for transmitting the sixth signal in the present disclosure.

Embodiment 5

Figure 5:
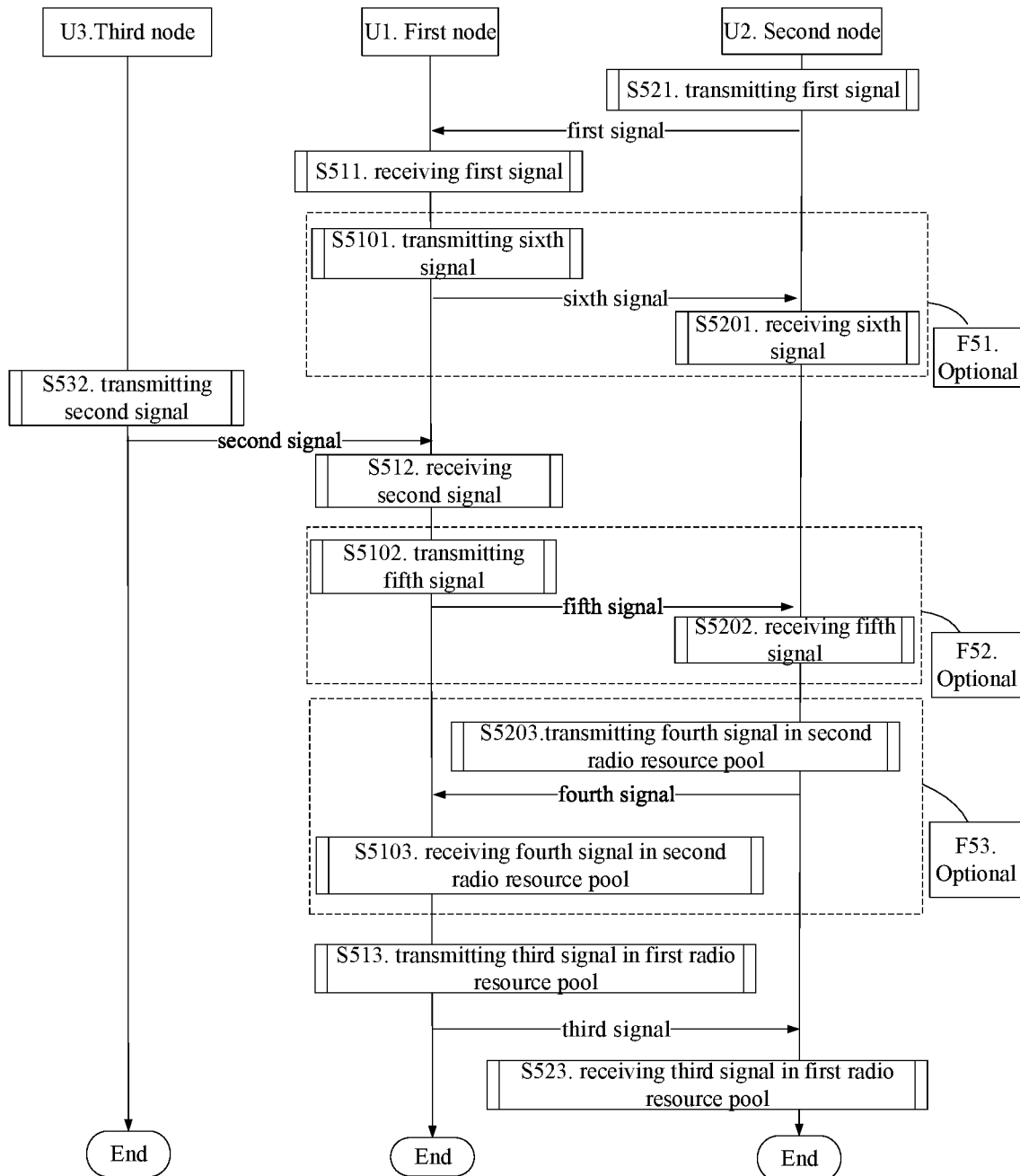
FIG. 5 illustrates a flowchart of wireless communications according to one embodiment of the present disclosure.

Embodiment 5 illustrates a flowchart of wireless transmission according to one embodiment in the present disclosure, as shown in FIG. 5. In FIG. 5, a first node U1, a second node U2 and a third node U3 are in communications via an air interface. Boxes marked as F51, f52 and F53 in the figure are optional. Particularly, the sequential order of steps in these boxes in FIG. 5 does not necessarily mean that the steps are chronologically arranged.

The first node U1 receives a first signal in step S511; transmits a sixth signal in step S5101; receives a second signal in step S512; transmits a fifth signal in step S5102; receives a fourth signal in a second radio resource pool in step S5103; and transmits a third signal in a first radio resource pool in step S513.

The first node U2 transmits a first signal in step S521; receives a sixth signal in step S5201; receives a fifth signal in step S5202; transmits a fourth signal in a second radio resource pool in step S5203; and receives a third signal in a first radio resource pool in step S523.

The third node U3 transmits a second signal in step S532.

In Embodiment 5, the first signal is used for determining first information, the first information being related to channel quality between the first node and a transmitter of the first signal; the second signal is used for determining second information, the second information being related to channel quality between a transmitter of the second signal and the first node; the transmitter of the first signal is different from the transmitter of the second signal; the first information and the second information are used together for determining a magnitude of time-domain resources occupied by the third signal.

In Embodiment 5, the fourth signal carries a first bit block; the third signal comprises indication information on whether the first bit block is correctly received; the second information is used for determining transmission power of the third signal; the fifth signal is used for determining the second information; a transmission format of the third signal is one format in a first format set, and the first information and the second information are used together for determining a transmission format of the third signal out of the first format set; and the sixth signal is used for determining the first information.

In Embodiment 5, the first information is used for calculating a first value, and the second information is used for calculating a second value; when a difference value between the first value and the second value is less than a first threshold, a transmission format of the third signal is a first format; otherwise, a transmission format of the third signal is a second format; herein, a number of the time-domain resources occupied by the first format is less than a number of the time-domain resources occupied by the second format, and the first threshold is a non-negative number.

In one embodiment, the first node U1 is the first node in the present disclosure.

In one embodiment, the second node U2 is the second node in the present disclosure.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 comprises a radio interface between a base station and a UE.

In one embodiment, an air interface between the second node U2 and the first node U1 comprises a radio interface between a relay node and a UE.

In one embodiment, an air interface between the second node U2 and the first node U1 is a PC5 interface.

In one embodiment, an air interface between the second node U2 and the first node U1 comprises a Sidelink.

In one embodiment, an air interface between the second node U2 and the first node U1 comprises a radio interface between UEs.

In one embodiment, the third node U3 is a base station.

In one embodiment, an air interface between the third node U3 and the first node U1 is a Uu interface.

In one embodiment, an air interface between the third node U3 and the first node U1 comprises a cellular link.

In one embodiment, an air interface between the third node U3 and the first node U1 comprises a radio interface between a base station and a UE.

In one embodiment, the first node in the present disclosure is a terminal.

In one embodiment, the first node in the present disclosure is a car.

In one embodiment, the first node in the present disclosure is a vehicle.

In one embodiment, the first node in the present disclosure is a Road Side Unit (RSU).

In one embodiment, the second node in the present disclosure is a terminal.

In one embodiment, the second node in the present disclosure is a car.

In one embodiment, the second node in the present disclosure is a vehicle.

In one embodiment, the second node in the present disclosure is an RSU.

In one embodiment, the second node in the present disclosure is a base station.

In one embodiment, the fourth signal is a baseband signal.
In one embodiment, the fourth signal is a radio signal.
In one embodiment, the fourth signal is Unicast.
In one embodiment, the fourth signal is Groupcast.
In one embodiment, the fourth signal is Broadcast.
In one embodiment, the fourth signal is transmitted via a PC5 interface.
In one embodiment, the fourth signal is transmitted via a Uu interface.
In one embodiment, the fourth signal is transmitted on a Sidelink.
In one embodiment, the fourth signal is transmitted on a cellular link.
In one embodiment, the fifth signal is a baseband signal.
In one embodiment, the fifth signal is a radio signal.
In one embodiment, the fifth signal is Unicast.
In one embodiment, the fifth signal is Groupcast.
In one embodiment, the fifth signal is Broadcast.
In one embodiment, the fifth signal is transmitted via a PC5 interface.
In one embodiment, the fifth signal is transmitted via a Uu interface.
In one embodiment, the fifth signal is transmitted on a Sidelink.
In one embodiment, the fifth signal is transmitted on a cellular link.
In one embodiment, the sixth signal is a baseband signal.
In one embodiment, the sixth signal is a radio signal.
In one embodiment, the sixth signal is Unicast.
In one embodiment, the sixth signal is Groupcast.
In one embodiment, the sixth signal is Broadcast.
In one embodiment, the sixth signal is transmitted via a PC5 interface.
In one embodiment, the sixth signal is transmitted via a Uu interface.
In one embodiment, the sixth signal is transmitted on a Sidelink.
In one embodiment, the sixth signal is transmitted on a cellular link.

In one embodiment, the second radio resource pool is a Physical Sidelink Shared Channel (PSSCH).

In one embodiment, the second radio resource pool is a Physical Downlink Shared Channel (PDSCH).

In one embodiment, the second radio resource pool is a Narrow-band Physical Downlink Shared Channel (NPDSCH).

In one embodiment, the second radio resource pool is a Short Physical Downlink Shared Channel (SPDSCH).

In one embodiment, the second radio resource pool comprises a PSSCH.

In one embodiment, the second radio resource pool comprises a PDSCH.

In one embodiment, the second radio resource pool comprises an NPDSCH.

In one embodiment, the second radio resource pool comprises an SPDSCH.

In one embodiment, the first node U1 receives a first signaling, and the first signaling comprises scheduling information of the fourth signal.

In one subembodiment of the above embodiment, the scheduling information comprises one or more of occupied time-domain resources, occupied frequency-domain resources, an MCS, configuration information of DMRS, a HARQ process ID, a Redundancy Version, an NDI and a priority.

In one subembodiment of the above embodiment, the first signaling is Downlink Control Information (DCI).

In one subembodiment of the above embodiment, the first signaling comprises one or more fields in DCI.

In one subembodiment of the above embodiment, the first signaling is Sidelink Control Information (SCI).

In one subembodiment of the above embodiment, the first signaling comprises one or more fields in SCI.

In one subembodiment of the above embodiment, the first signaling is 1st-stage SCI of Two-stage SCI in V2X communications.

In one subembodiment of the above embodiment, the first signaling comprises one or more fields in 1st-stage SCI of Two-stage SCI in V2X communications.

In one subembodiment of the above embodiment, the first signaling is 2nd-stage SCI of Two-stage SCI in V2X communications.

In one subembodiment of the above embodiment, the first signaling comprises one or more fields in 2nd-stage SCI of Two-stage SCI in V2X communications.

In one subembodiment of the above embodiment, the first signaling is a PHY signaling.

In one subembodiment of the above embodiment, the first signaling is a Higher Layer signaling.

In one subembodiment of the above embodiment, the first signaling is transmitted on a Physical Sidelink Control Channel (PSCCH).

In one subembodiment of the above embodiment, a modulation method of the first signaling is QPSK.

In one subembodiment of the above embodiment, the first signaling is transmitted on a PSSCH.

In one embodiment, the fourth signal employs a Low-density Parity-check (LDPC) code for coding.

In one embodiment, the third signal employs a Polar Code for coding.

In one embodiment, the third signal comprises a sequence.

In one subembodiment of the above embodiment, the sequence is a Zadoff-Chu (ZC) sequence.

In one subembodiment of the above embodiment, the sequence comprises a pseudo-random sequence.

In one embodiment, the phrase whether the first bit block is correctly received comprises that a receiver of the fourth signal performs channel decoding on the fourth signal; when a decoding result of the channel decoding passes a CRC check, the first bit block is correctly received, otherwise the first bit block is not correctly received.

In one embodiment, when the third signal indicates that the first bit block is correctly received, the third signal comprises a ACK.

In one embodiment, when the third signal indicates that the first bit block is not correctly received, the third signal comprises a NACK.

In one embodiment, the phrase that the fourth signal carries a first bit block comprises that the fourth signal is an output of all or part of bits in the first bit block sequentially subjected to part or all of Cyclic Redundancy Check (CRC) Attachment, Segmentation, Code Block-level CRC Attachment, Channel Coding, Rate Matching, Concatenation, Scrambling, Modulation Mapper, Layer Mapper, Transform Precoder, Precoding, Resource Element Mapper, multicarrier symbol generation, and Modulation and Upconversion.

In one embodiment, the fifth signal comprises the second information.

In one embodiment, the fifth signal comprises fifth information, and the fifth information is used for calculating the second information.

In one subembodiment of the above embodiment, the fifth information is RSRP measured by the first node.

In one subembodiment of the above embodiment, the second information is a pathloss between the first node and a transmitter of the second signal.

In one embodiment, the first format set comprises the first format and the second format, the first format comprises an OFDM symbol, and the second format comprises multiple OFDM symbols.

In one embodiment, the first format set comprises the first format and the second format, a number of OFDM symbols occupied by the first format is different from a number of OFDM symbols occupied by the second format.

In one embodiment, the first radio resource pool is related to a transmission format of the third signal.

In one embodiment, time-frequency resources occupied by the first radio resource pool is related to a transmission format of the third signal.

In one embodiment, the first information and the second information are used together for determining whether a transmission format of the third signal is Long Format or Short Format.

In one embodiment, a transmission format of the third signal is one of PUCCH Format 0, PUCCH Format 1, PUCCH Format 2, PUCCH Format 3 or PUCCH Format 4.

In one embodiment, a transmission format of the third signal is PSFCH Format 0.

In one embodiment, a transmission format of the third signal is PSFCH Format 1.

In one embodiment, the sixth signal comprises the first information.

In one embodiment, the sixth signal comprises sixth information, and the sixth information is used for calculating the first information.

In one subembodiment of the above embodiment, the sixth information is RSRP measured by the first node.

In one subembodiment of the above embodiment, the first information is a pathloss between the first node and a receiver of the sixth signal.

In one embodiment, the sixth signal comprises a third reference signal, and the third reference signal is used for determining first information.

In one subembodiment of the above embodiment, a receiver of the sixth signal obtains RSRP by measuring the third reference signal, and the RSRP is used for calculating the first information.

In one subembodiment of the above embodiment, the third reference signal is a DMRS.

In one subembodiment of the above embodiment, the third reference signal is a CSI-RS.

In one subembodiment of the above embodiment, the third reference signal is an SRS.

In one subembodiment of the above embodiment, the third reference signal is an SL CSI-RS.

In one embodiment, the first radio resource pool comprises a positive integer number of Resource Block(s) (RB) in frequency domain.

In one embodiment, the first radio resource pool comprises a positive integer number of Physical resource block(s) (PRB) in frequency domain.

In one embodiment, the first radio resource pool comprises a positive integer number of sub-channel(s) in frequency domain.

In one embodiment, the first radio resource pool comprises a positive integer number of sub-carrier(s) (SC) in frequency domain.

In one embodiment, the first radio resource pool comprises a positive integer number of slot(s) in time domain.

In one embodiment, the first radio resource pool comprises a positive integer number of mini-slot(s) in time domain.

In one embodiment, the first radio resource pool comprises a positive integer number of ms(s) in time domain.

In one embodiment, the first radio resource pool comprises a positive integer number of OFDM symbol(s) in time domain.

In one embodiment, the first radio resource pool comprises a positive integer number of sub-frame(s) in time domain.

In one embodiment, the second radio resource pool comprises a positive integer number of RB(s) in frequency domain.

In one embodiment, the second radio resource pool comprises a positive integer number of PRB(s) in frequency domain.

In one embodiment, the second radio resource pool comprises a positive integer number of sub-channel(s) in frequency domain.

In one embodiment, the second radio resource pool comprises a positive integer number of SC(s) in frequency domain.

In one embodiment, the second radio resource pool comprises a positive integer number of slot(s) in time domain.

In one embodiment, the second radio resource pool comprises a positive integer number of mini-slot(s) in time domain.

In one embodiment, the second radio resource pool comprises a positive integer number of ms(s) in time domain.

In one embodiment, the second radio resource pool comprises a positive integer number of OFDM symbol(s) in time domain.

In one embodiment, the second radio resource pool comprises a positive integer number of sub-frame(s) in time domain.

In one embodiment, steps in box F51 in FIG. 5 exist.

In one embodiment, steps in box F51 in FIG. 5 do not exist.

In one embodiment, steps in box F52 in FIG. 5 exist.

In one embodiment, steps in box F52 in FIG. 5 do not exist.

In one embodiment, steps in box F53 in FIG. 5 exist.

In one embodiment, steps in box F53 in FIG. 5 do not exist.

Embodiment 6

Figure 6:
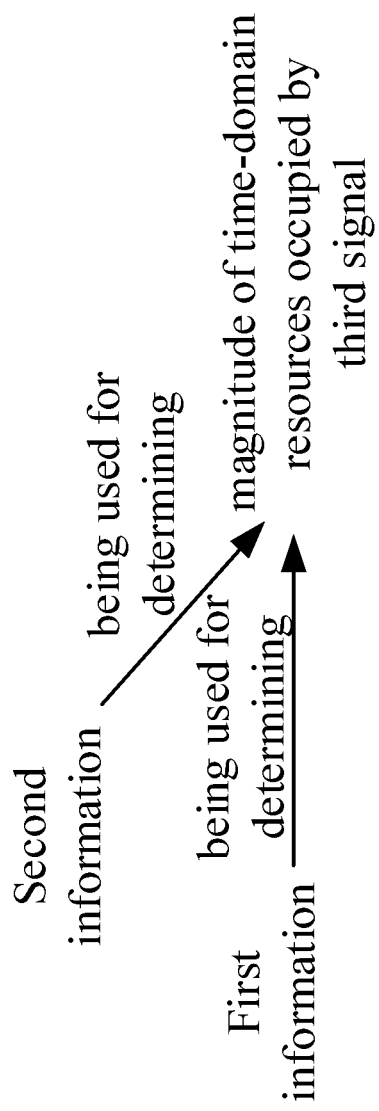
FIG. 6 illustrates a schematic diagram of relations among first information, second information and a magnitude of time-domain resources occupied by a third signal according to one embodiment of the present disclosure.

Embodiment 6 illustrates a schematic diagram of relations among first information, second information and a magnitude of time-domain resources occupied by a third signal according to one embodiment of the present disclosure, as shown in FIG. 6.

In Embodiment 6, the first information and the second information are used together for determining a magnitude of time-domain resources occupied by the third signal.

In one embodiment, the first information is used for calculating a first value, and the second information is used for calculating a second value; when a difference value between the first value and the second value is less than a first threshold, a transmission format of the third signal is a first format; otherwise, a transmission format of the third signal is a second format; herein, a number of the time-domain resources occupied by the first format is less than a number of the time-domain resources occupied by the second format, and the first threshold is a non-negative number.

In one subembodiment of the above embodiment, a difference value between the first value and the second value comprises a value obtained by subtracting a second value from the first value.

In one embodiment, the first threshold is equal to 0.

In one embodiment, the first threshold is greater than 0.

In one embodiment, the first information is used for calculating a third value, and the second information is used for calculating a fourth value; when a difference value between the third value and the fourth value is less than a second threshold, the third signal occupies a first time-domain resource block; otherwise, the third signal occupies a second time-domain resource block; herein, a number of the time-domain resources occupied by the first time-domain resource block is less than a number of the time-domain resources occupied by the second time-domain resource block, and the second threshold is a non-negative number.

In one subembodiment of the above embodiment, a difference value between the third value and the fourth value comprises a value obtained by subtracting a fourth value from the third value.

In one subembodiment of the above embodiment, the second threshold is equal to 0.

In one subembodiment of the above embodiment, the second threshold is greater than 0.

In one embodiment, the second value is equal to a magnitude of transmission power of the third signal.

Embodiment 7

Embodiment 7 illustrates a schematic diagram of a calculation method of a first value according to one embodiment of the present disclosure, as shown in FIG. 7.

In Embodiment 7, the first value is equal to a minimum value between a first upper limit and a first calculation value; and the first calculation value is equal to a value of a first parameter multiplied by the first information plus a first threshold plus a first adjustment.

In one subembodiment of the Embodiment 7, the first upper limit is configured maximum transmission power.

In one subembodiment of the Embodiment 7, the first upper limit is equal to $P_{CMAX}$, and the specific meaning of the $P_{CMAX}$ can be found in TS38.101-1.

In one subembodiment of the Embodiment 7, the first threshold is a target reception power.

In one subembodiment of the Embodiment 7, the first parameter is a weight for weighing a pathloss.

In one subembodiment of the Embodiment 7, the first threshold is a p0-DL-PSFCH value.

In one subembodiment of the Embodiment 7, the first parameter is an alpha-DL-PSFCH value.

In one subembodiment of the Embodiment 7, the first parameter is equal to 1.

In one subembodiment of the Embodiment 7, the first adjustment is equal to $10 \log_{10}(2^\mu)$; herein, the $\mu$ is equal to one of 0, 1, 2, 3 or 4.

In one subembodiment of the Embodiment 7, the first adjustment is related to a number of RBs of the first radio resource pool.

In one subembodiment of the Embodiment 7, the first adjustment is related to a transmission format of the third signal.

In one subembodiment of the Embodiment 7, the first information is equal to $PL_{b,f,c}(q_d)$; and the specific meaning of the $PL_{b,f,c}(q_d)$ can be found in TS38.213, section 7.1.1.

In one subembodiment of the Embodiment 7, the first value is measured by dBm.

Embodiment 8

Embodiment 8 illustrates a schematic diagram of a calculation method of a first value according to one embodiment of the present disclosure, as shown in FIG. 8.

In Embodiment 8, the first value is equal to a minimum value between a first upper limit and a first calculation value; the first calculation value is equal to a value of a first parameter multiplied by the first information plus an addition of a first threshold and a first adjustment and a second adjustment.

In one subembodiment of the Embodiment 8, the first upper limit is configured maximum transmission power.

In one subembodiment of the Embodiment 8, the first upper limit is equal to $P_{CMAX}$, and the specific meaning of the $P_{CMAX}$ can be found in TS38.101-1.

In one subembodiment of the Embodiment 8, the first threshold is a target reception power.

In one subembodiment of the Embodiment 8, the first parameter is a weight for weighing a pathloss.

In one subembodiment of the Embodiment 8, the first threshold is a p0-DL-PSFCH value.

In one subembodiment of the Embodiment 8, the first parameter is an alpha-DL-PSFCH value.

In one subembodiment of the Embodiment 8, the first parameter is equal to 1.

In one subembodiment of the Embodiment 8, the first adjustment is equal to $10 \log_{10}(2^\mu)$; herein, the $\mu$ is equal to one of 0, 1, 2, 3 or 4.

In one subembodiment of the Embodiment 8, the first adjustment is related to a number of RBs of the first radio resource pool.

In one subembodiment of the Embodiment 7, the second adjustment is related to a transmission format of the third signal.

In one subembodiment of the Embodiment 8, the first information is equal to $PL_{b,f,c}(q_d)$; and the specific meaning of the $PL_{b,f,c}(q_d)$ can be found in TS38.213, section 7.1.1.

In one subembodiment of the Embodiment 7, the first value is measured by dBm.

Embodiment 9

Embodiment 9 illustrates a schematic diagram of a calculation method of a second value according to one embodiment of the present disclosure, as shown in FIG. 9.

In Embodiment 9, the second value is equal to a minimum value between a second upper limit and a second calculation value; the second calculation value is equal to a value of a second parameter multiplied by the second information plus the second threshold plus a third adjustment.

In one subembodiment of the Embodiment 9, the second upper limit is configured maximum transmission power.

In one subembodiment of the Embodiment 9, the second upper limit is equal to $P_{CMAX}$, and the specific meaning of the $PC_{MAX}$ can be found in TS38.101-1.

In one subembodiment of the Embodiment 9, the second threshold is a target reception power.

In one subembodiment of the Embodiment 9, the second parameter is a weight for weighing a pathloss.

In one subembodiment of the Embodiment 9, the second threshold is a p0-DL-PSFCH value.

In one subembodiment of the Embodiment 9, the second parameter is an alpha-DL-PSFCH value.

In one subembodiment of the Embodiment 9, the second parameter is equal to 1.

In one subembodiment of the Embodiment 9, the third adjustment is equal to $10 \log_{10}(2^\mu)$; herein, the $\mu$ is equal to one of 0, 1, 2, 3 or 4.

In one subembodiment of the Embodiment 9, the third adjustment is related to a number of RBs of the first radio resource pool.

In one subembodiment of the Embodiment 9, the third adjustment is related to a transmission format of the third signal.

In one subembodiment of the Embodiment 9, the second information is equal to $PL_{b,f,c}(q_d)$; and the specific meaning of the $PL_{b,f,c}(q_d)$ can be found in TS38.213, section 7.1.1.

In one subembodiment of the Embodiment 9, the second value is measured by dBm.

Embodiment 10

Embodiment 10 illustrates a schematic diagram of a calculation method of a second value according to one embodiment of the present disclosure, as shown in FIG. 10.

In Embodiment 10, the second value is equal to a minimum value between a second upper limit and a second calculation value; the second calculation value is equal to a second threshold plus a value of a second parameter multiplied by the second information plus a third adjustment plus a fourth adjustment.

In one subembodiment of the Embodiment 10, the second upper limit is configured maximum transmission power.

In one subembodiment of the Embodiment 10, the second upper limit is equal to $P_{CMAX}$, and the specific meaning of the $P_{CMAX}$ can be found in TS38.101-1.

In one subembodiment of the Embodiment 10, the second threshold is a target reception power.

In one subembodiment of the Embodiment 10, the second parameter is a weight for weighing a pathloss.

In one subembodiment of the Embodiment 10, the second threshold is a p0-DL-PSFCH value.

In one subembodiment of the Embodiment 10, the second parameter is an alpha-DL-PSFCH value.

In one subembodiment of the Embodiment 10, the second parameter is equal to 1.

In one subembodiment of the Embodiment 10, the third adjustment is equal to $10 \log_{10}(2^\mu)$; herein, the $\mu$ is equal to one of 0, 1, 2, 3 or 4.

In one subembodiment of the Embodiment 10, the third adjustment is related to a number of RBs of the first radio resource pool.

In one subembodiment of the Embodiment 10, the fourth adjustment is related to a transmission format of the third signal.

In one subembodiment of the Embodiment 10, the second information is equal to $PL_{b,f,c}(q_d)$; and the specific meaning of the $PL_{b,f,c}(q_d)$ can be found in TS38.213, section 7.1.1.

In one subembodiment of the Embodiment 10, the second value is measured by dBm.

Embodiment 11

Figure 11:
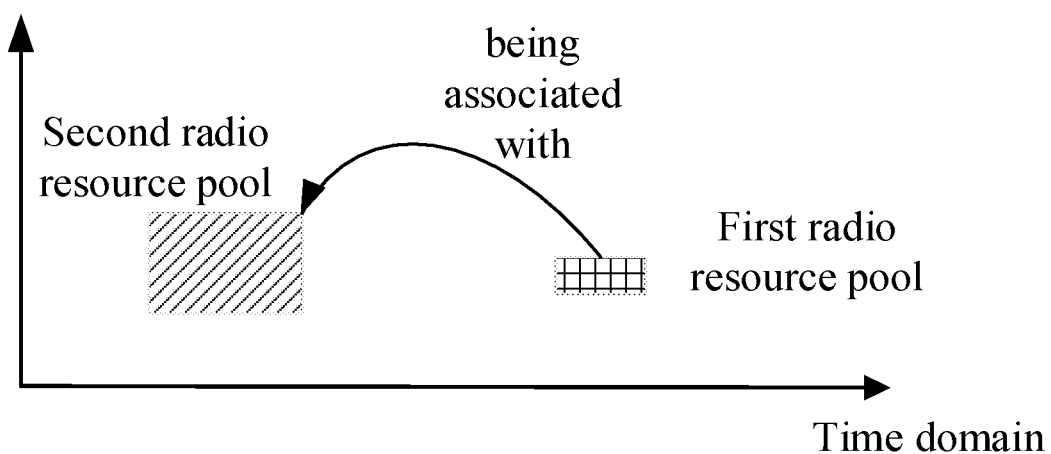
FIG. 11 illustrates a schematic diagram of a relation between a second radio resource pool and a first radio resource pool according to one embodiment of the present disclosure.

Embodiment 11 illustrates a schematic diagram of a relationship between a second radio resource pool and a first radio resource pool according to one embodiment of the present disclosure, as shown in FIG. 11. In FIG. 11, the slash-filled rectangle represents the second radio resource pool; and the reticle-filled rectangle represents the first radio resource pool.

In Embodiment 11, the first radio resource pool is associated with the second radio resource pool.

In one embodiment, resources occupied by the first radio resource pool are related to resources occupied by the second radio resource pool.

In one embodiment, the phrase that resources occupied by the first radio resource pool are related to resources occupied by the second radio resource pool comprises that time-frequency resources occupied by the first radio resource pool are associated with time-frequency resources occupied by the second radio resource pool, wherein the association rule is predefined.

In one embodiment, the phrase that resources occupied by the first radio resource pool are related to resources occupied by the second radio resource pool comprises that time-frequency resources occupied by the first radio resource pool are associated with time-frequency resources occupied by the second radio resource pool, wherein the association rule is indicated by a higher layer signaling.

In one embodiment, the phrase that resources occupied by the first radio resource pool are related to resources occupied by the second radio resource pool comprises that when time-frequency resources occupied by the second radio resource pool are determined, time-frequency resources occupied by the first radio resource pool are also implicitly determined.

In one embodiment, frequency-domain resources occupied by the first radio resource pool are subsets of frequency-domain resources occupied by the second radio resource pool.

In one embodiment, frequency-domain resources occupied by the first radio resource pool have overlap with frequency-domain resources occupied by the second radio resource pool.

In one embodiment, frequency-domain resources occupied by the first radio resource pool have no overlap with frequency-domain resources occupied by the second radio resource pool.

In one embodiment, frequency-domain resources occupied by the first radio resource pool are different from frequency-domain resources occupied by the second radio resource pool.

In one embodiment, frequency-domain resources occupied by the first radio resource pool are the same with frequency-domain resources occupied by the second radio resource pool.

In one embodiment, the second radio resource pool comprises a PSSCH, and the first radio resource pool comprises a PSFCH corresponding to the PSSCH.

In one embodiment, the first radio resource pool is reserved for a HARQ-ACK corresponding to a signal transmitted in the second radio resource pool.

In one embodiment, a HARQ-ACK corresponding to the fourth signal that is transmitted in the second radio resource pool is transmitted in the first radio resource pool.

Embodiment 12

Figure 12:
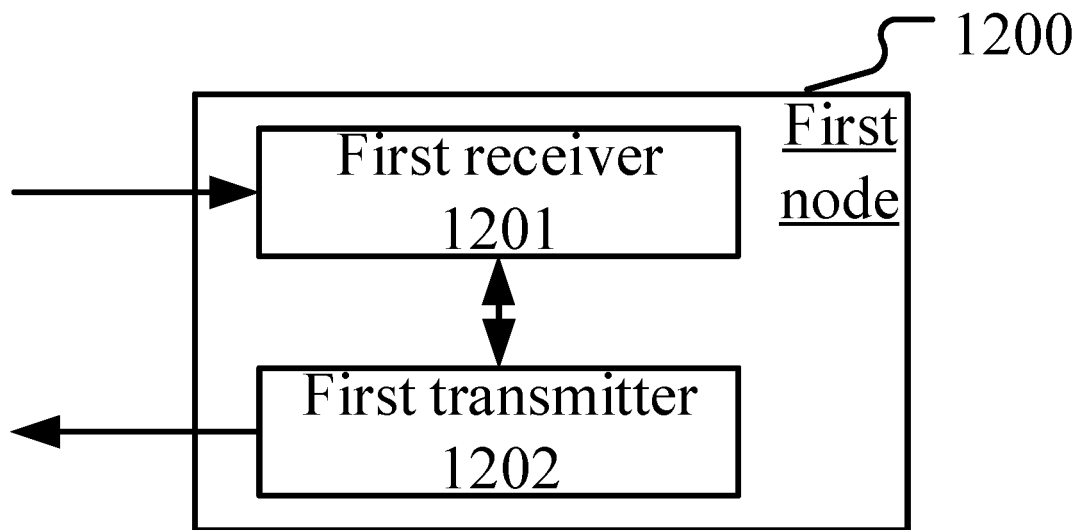
FIG. 12 illustrates a structure block diagram of a processing device in a first node according to one embodiment of the present disclosure.

Embodiment 12 illustrates a structure block diagram of a processing device in a first node according to one embodiment of the present disclosure, as shown in FIG. 12. In FIG. 12, a first node's processing device 1200 comprises a first receiver 1201 and a first transmitter 1202.

In Embodiment 12, the first receiver 1201 receives a first signal and a second signal; the first transmitter 1202 transmits a third signal in a first radio resource pool.

In Embodiment 12, the first signal is used for determining first information, the first information being related to channel quality between the first node and a transmitter of the first signal; the second signal is used for determining second information, the second information being related to channel quality between a transmitter of the second signal and the first node; the transmitter of the first signal is different from the transmitter of the second signal; the first information and the second information are used together for determining a magnitude of time-domain resources occupied by the third signal.

In one embodiment, the first receiver 1201 receives a fourth signal in a second radio resource pool; herein, the fourth signal carries a first bit block, and the third signal comprises indication information on whether the first bit block is correctly received.

In one embodiment, the second information is used for determining transmission power of the third signal.

In one embodiment, the first transmitter 1202 transmits a fifth signal, and the fifth signal is used for determining the second information.

In one embodiment, a transmission format of the third signal is one format in a first format set, and the first information and the second information are used together for determining a transmission format of the third signal out of the first format set.

In one embodiment, the first transmitter 1202 transmits a sixth signal, and the sixth signal is used for determining the first information.

In one embodiment, the first information is used for calculating a first value, and the second information is used for calculating a second value; when a difference value between the first value and the second value is less than a first threshold, a transmission format of the third signal is a first format; otherwise, a transmission format of the third signal is a second format; herein, a number of the time-domain resources occupied by the first format is less than a number of the time-domain resources occupied by the second format, and the first threshold is a non-negative number.

In one embodiment, a receiver of the third signal is a UE, and the first information is a pathloss between a receiver and transmitter of the third signal; the second information is a pathloss between a transmitter of the third signal and a base station; the first information is used for calculating a first value, and the second information is used for calculating a second value; when a difference value between the first value and the second value is less than a first threshold, a transmission format of the third signal is a first format; otherwise, a transmission format of the third signal is a second format; herein, the third signal comprises a HARQ-ACK transmitted on a PSFCH, a number of the time-domain resources occupied by the first format is less than a number of the time-domain resources occupied by the second format, and the first threshold is a non-negative number; the first format and the second format are respectively two different PSFCH formats; and the second value is equal to transmission power of the third signal.

In one embodiment, the first node is a UE.

In one embodiment, the first node is a relay node.

In one embodiment, the first receiver 1201 comprises at least one of the antenna 420, the receiver 418, the receiving processor 470, the channel decoder 478, the controller/processor 475 or the memory in Embodiment 4.

In one embodiment, the first transmitter 1202 comprises at least one of the antenna 420, the transmitter 418, the transmitting processor 416, the channel encoder 477, the controller/processor 475 or the memory in Embodiment 4.

Embodiment 13

Figure 13:
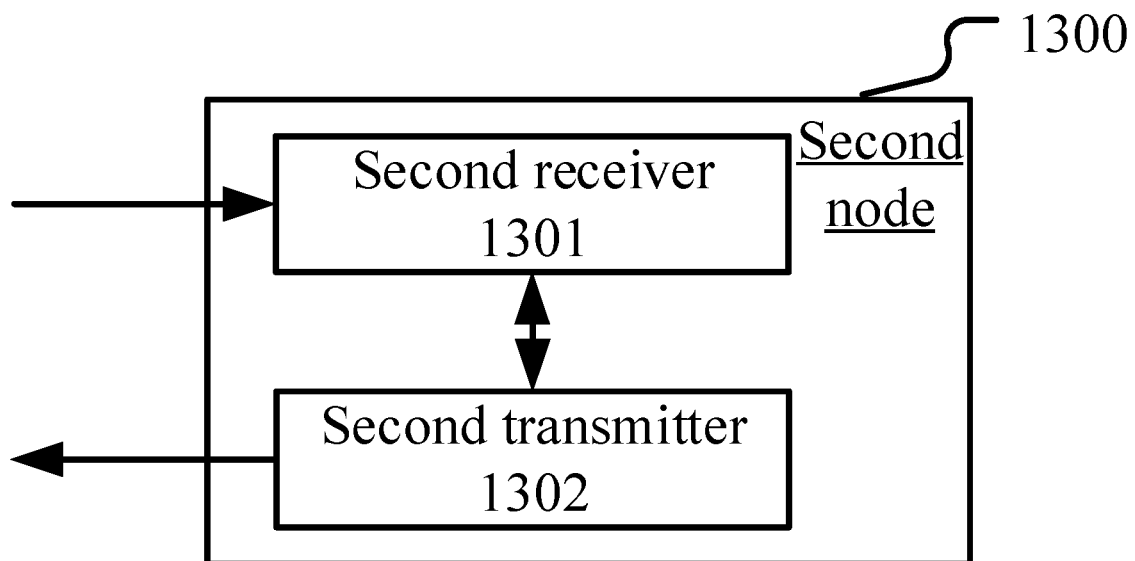
FIG. 13 illustrates a structure block diagram of a processing device in a second node according to one embodiment of the present disclosure.

Embodiment 13 illustrates a structure block diagram of a processing device in a second node according to one embodiment of the present disclosure, as shown in FIG. 13. In FIG. 13, a second node's processing device 1300 comprises a second receiver 1301 and a second transmitter 1302.

In Embodiment 13, the second transmitter 1302 transmits a first signal; the second receiver 1301 receives a third signal in a first radio resource pool.

In Embodiment 13, the first signal is used for determining first information, the first information being related to channel quality between the second node and a receiver of the first signal; a second signal is used for determining second information, the second information being related to channel quality between a transmitter of the second signal and a receiver of the second signal; the second node is different from the transmitter of the second signal; the first information and the second information are used together for determining a magnitude of time-domain resources occupied by the third signal.

In one embodiment, the second transmitter 1302 transmits a fourth signal in a second radio resource pool; herein, the fourth signal carries a first bit block, and the third signal comprises indication information on whether the first bit block is correctly received.

In one embodiment, the second information is used for determining transmission power of the third signal.

In one embodiment, the second receiver 1301 receives a fifth signal, and the fifth signal is used for determining the second information.

In one embodiment, a transmission format of the third signal is one format in a first format set, and the first information and the second information are used together for determining a transmission format of the third signal out of the first format set.

In one embodiment, the second receiver 1301 receives a sixth signal, and the sixth signal is used for determining the first information.

In one embodiment, the first information is used for calculating a first value, and the second information is used for calculating a second value; when a difference value between the first value and the second value is less than a first threshold, a transmission format of the third signal is a first format; otherwise, a transmission format of the third signal is a second format; herein, a number of the time-domain resources occupied by the first format is less than a number of the time-domain resources occupied by the second format, and the first threshold is a non-negative number.

In one embodiment, the second node is a UE.
In one embodiment, the second node is a relay node.
In one embodiment, the second node is a base station.
In one embodiment, the second receiver 1301 comprises at least one of the antenna 452, the receiver 454, the receiving processor 456, the multi-antenna receiving processor 458, the controller/processor 459, the memory 460 or the data source 467 in Embodiment 4.

In one embodiment, the second transmitter 1302 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
   a first receiver, receiving a first signal and a second signal; and
   a first transmitter, transmitting a third signal in a first radio resource pool; wherein:
   the first signal comprises a first reference signal, and the first reference signal is used for determining first information, the first information being related to channel quality between the first node and a transmitter of the first signal;
   the second signal comprises a second reference signal, and the second reference signal is used for determining second information, the second information being related to channel quality between a transmitter of the second signal and the first node;
   the transmitter of the first signal is different from the transmitter of the second signal; and
   the first information and the second information are used together for determining a magnitude of time-domain resources occupied by the third signal;
   the first information is used for calculating a first value, and the second information is used for calculating a second value; when a difference value between the first value and the second value is less than a first threshold, a transmission format of the third signal is a first format; otherwise, the transmission format of the third signal is a second format; a number of time-domain resources occupied by the first format is less than a number of the time-domain resources occupied by the second format, and the first threshold is a non-negative number.

2. The first node according to claim 1, wherein a transmission format of the third signal is one format in a first format set, and the first information and the second information are used together for determining the transmission format of the third signal out of the first format set.

3. The first node according to claim 1, comprising:
the first receiver, receiving a fourth signal in a second radio resource pool; wherein the fourth signal carries a first bit block, and the third signal comprises indication information on whether the first bit block is correctly received;
or, comprising:
the first transmitter, transmitting a fifth signal; wherein the fifth signal is used for determining the second information;
or, comprising:
the first transmitter, transmitting a sixth signal; wherein the sixth signal is used for determining the first information.

4. The first node according to claim 1, wherein the second information is used for determining transmission power of the third signal.

5. The first node according to claim 1, wherein the first value is equal to a minimum value between a first upper limit and a first calculation value, and the first calculation value is equal to a value of a first parameter multiplied by the first information plus the first threshold plus a first adjustment; the first upper limit is configured maximum transmission power, the first threshold is target reception power, and the first parameter is a weight for weighing a pathloss; the first threshold is a value of p0-DL-PSFCH or alpha-DL-PSFCH, the first adjustment is equal to $10 \log_{10}(2^\mu)$, and the $\mu$ is equal to one of 0, 1, 2, 3 or 4; and the second value is equal to transmission power of the third signal.

6. A second node for wireless communications, comprising:
a second transmitter, transmitting a first signal; and
a second receiver, receiving a third signal in a first radio resource pool;
wherein the first signal comprises a first reference signal, and the first reference signal is used for determining first information, the first information being related to channel quality between the second node and a receiver of the first signal; a second signal comprises a second reference signal, and the second reference signal is used for determining second information, the second information being related to channel quality between a transmitter of the second signal and a receiver of the second signal; the second node is different from the transmitter of the second signal; the first information and the second information are used together for determining a magnitude of time-domain resources occupied by the third signal;
the first information is used for calculating a first value, and the second information is used for calculating a second value; when a difference value between the first value and the second value is less than a first threshold, a transmission format of the third signal is a first format; otherwise, the transmission format of the third signal is a second format; a number of time-domain resources occupied by the first format is less than a number of the time-domain resources occupied by the second format, and the first threshold is a non-negative number.

7. The second node according to claim 6, wherein a transmission format of the third signal is one format in a first format set, and the first information and the second information are used together for determining the transmission format of the third signal out of the first format set.

8. The second node according to claim 6, comprising:
the second transmitter, transmitting a fourth signal in a second radio resource pool; wherein the fourth signal carries a first bit block, and the third signal comprises indication information on whether the first bit block is correctly received;
or, comprising:
the second receiver, receiving a fifth signal; wherein the fifth signal is used for determining the second information;
or, comprising:
the second receiver, receiving a sixth signal; wherein the sixth signal is used for determining the first information.

9. A method in a first node for wireless communications, comprising:
receiving a first signal and a second signal; and
transmitting a third signal in a first radio resource pool;
wherein the first signal comprises a first reference signal, and the first reference signal is used for determining first information, the first information being related to channel quality between the first node and a transmitter of the first signal; the second signal comprises a second reference signal, and the second reference signal is used for determining second information, the second information being related to channel quality between a transmitter of the second signal and the first node; the transmitter of the first signal is different from the transmitter of the second signal; the first information and the second information are used together for determining a magnitude of time-domain resources occupied by the third signal;
the first information is used for calculating a first value, and the second information is used for calculating a second value; when a difference value between the first value and the second value is less than a first threshold, a transmission format of the third signal is a first format; otherwise, the transmission format of the third signal is a second format; a number of time-domain resources occupied by the first format is less than a number of the time-domain resources occupied by the second format, and the first threshold is a non-negative number.

10. The method in the first node according to claim 9, wherein a transmission format of the third signal is one format in a first format set, and the first information and the second information are used together for determining the transmission format of the third signal out of the first format set.

11. The method in the first node according to claim 9, comprising:
receiving a fourth signal in a second radio resource pool; wherein the fourth signal carries a first bit block, and the third signal comprises indication information on whether the first bit block is correctly received;
or, comprising:
transmitting a fifth signal; wherein the fifth signal is used for determining the second information;
or, comprising:
transmitting a sixth signal; wherein the sixth signal is used for determining the first information.

12. The method in the first node according to claim 9, wherein the second information is used for determining transmission power of the third signal.

13. The method in the first node according to claim 9, wherein the first value is equal to a minimum value between a first upper limit and a first calculation value, and the first calculation value is equal to a value of a first parameter multiplied by the first information plus the first threshold plus a first adjustment; the first upper limit is configured maximum transmission power, the first threshold is target reception power, and the first parameter is a weight for weighing a pathloss; the first threshold is a value of p0-DL-PSFCH or alpha-DL-PSFCH, the first adjustment is equal to $10 \log_{10}(2^\mu)$, and the $\mu$ is equal to one of 0, 1, 2, 3 or 4; and the second value is equal to transmission power of the third signal.

14. A method in a second node for wireless communications, comprising:

transmitting a first signal; and receiving a third signal in a first radio resource pool;

wherein the first signal comprises a first reference signal, and the first reference signal is used for determining first information, the first information being related to channel quality between the second node and a receiver of the first signal; a second signal comprises a second reference signal, and the second reference signal is used for determining second information, the second information being related to channel quality between a transmitter of the second signal and a receiver of the second signal; the second node is different from the transmitter of the second signal; the first information and the second information are used together for determining a magnitude of time-domain resources occupied by the third signal;

the first information is used for calculating a first value, and the second information is used for calculating a second value; when a difference value between the first value and the second value is less than a first threshold, a transmission format of the third signal is a first format; otherwise, the transmission format of the third signal is a second format; a number of time-domain resources occupied by the first format is less than a number of the time-domain resources occupied by the second format, and the first threshold is a non-negative number.

15. The method in the second node according to claim 14, wherein a transmission format of the third signal is one format in a first format set, and the first information and the second information are used together for determining the transmission format of the third signal out of the first format set.

16. The method in the second node according to claim 14, comprising:

transmitting a fourth signal in a second radio resource pool; wherein the fourth signal carries a first bit block, and the third signal comprises indication information on whether the first bit block is correctly received;

or, comprising:

receiving a fifth signal; wherein the fifth signal is used for determining the second information;

or, comprising:

receiving a sixth signal; wherein the sixth signal is used for determining the first information.

* * * * *